(12) United States Patent
Kawakoya et al.

(10) Patent No.: US 11,748,476 B2
(45) Date of Patent: Sep. 5, 2023

(54) CONVERSION DEVICE AND CONVERSION PROGRAM

(71) Applicant: NIPPON TELEGRAPH AND TELEPHONE CORPORATION, Tokyo (JP)

(72) Inventors: Yuhei Kawakoya, Musashino (JP); Makoto Iwamura, Musashino (JP); Jun Miyoshi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 329 days.

(21) Appl. No.: 17/281,987

(22) PCT Filed: May 20, 2019

(86) PCT No.: PCT/JP2019/019975
§ 371 (c)(1),
(2) Date: Apr. 1, 2021

(87) PCT Pub. No.: WO2020/070918
PCT Pub. Date: Apr. 9, 2020

(65) Prior Publication Data
US 2021/0342444 A1 Nov. 4, 2021

(30) Foreign Application Priority Data
Oct. 5, 2018 (JP) .................................. 2018-190422

(51) Int. Cl.
*G06F 21/54* (2013.01)
*G06F 21/55* (2013.01)
(Continued)

(52) U.S. Cl.
CPC ............ *G06F 21/554* (2013.01); *G06F 21/54* (2013.01); *G06F 21/566* (2013.01); *G06F 21/64* (2013.01)

(58) Field of Classification Search
CPC ............................... G06F 21/54; G06F 21/566
See application file for complete search history.

(56) References Cited

U.S. PATENT DOCUMENTS 8,739,280 B2 * 5/2014 Chess .................... G06F 21/554
726/22
9,355,247 B1 * 5/2016 Thioux .................... G06F 21/53
(Continued)

OTHER PUBLICATIONS

English translation of International Preliminary Report on Patentability Chapter I for PCT/JP2019/019975, dated Mar. 23, 2021, 5 pages. (Year: 2021).*

(Continued)

*Primary Examiner* — Ponnoreay Pich
(74) *Attorney, Agent, or Firm* — XSENSUS LLP

(57) ABSTRACT

A conversion device includes processing circuitry configured to receive a programmable signature as a target to be analyzed and symbolized data and/or a log as an input value, analyze the programmable signature by using a symbolic execution engine, and output a conditional branching process executed on the input value as a constraint on the input value and receive the output constraint on the input value, perform field conversion from the constraint on the input value to an output format based on a table of field name correspondence between formats, and output a static signature.

4 Claims, 5 Drawing Sheets

(51) Int. Cl.
    *G06F 21/56* (2013.01)
    *G06F 21/64* (2013.01)

(56) References Cited

U.S. PATENT DOCUMENTS

| | | | | |
|---|---|---|---|---|
| 2006/0212942 | A1* | 9/2006 | Barford | H04L 63/1425 |
| | | | | 713/188 |
| 2008/0052780 | A1* | 2/2008 | Cao | H04L 63/1416 |
| | | | | 726/23 |
| 2017/0076116 | A1* | 3/2017 | Chen | G06F 21/554 |
| 2019/0325132 | A1* | 10/2019 | Manthos | G06F 21/554 |
| 2021/0342444 | A1* | 11/2021 | Kawakoya | G06F 21/554 |
| 2022/0277073 | A1* | 9/2022 | Peng | G06F 21/64 |

OTHER PUBLICATIONS

King, "Symbolic Execution and Program Testing", Communications of the ACM, vol. 19, Issue 7, Jul. 1976, pp. 385-394.

\* cited by examiner

FIG.3

```
1:for accessed_regkey in accessed_regkey_logs:
2:   if accessed_regkey=="xyz":
3:      regkey_detected=True
4:
5:for accessed_file in accessed_file_logs:
6:   if accessed_file=="abc":
7:      file_detected=True
8:
9:if regkey_detected & file_detected:
10:   return True
11:else:
12:   return False
```

FIG.4

| SYMBOLIC VARIABLE NAMES | CONVERSION DESTINATION FIELDS | |
|---|---|---|
| sym_regkey | RegistryItem | R1 |
| sym_file | FileItem | R2 |

| CONVERSION SOURCE OPERATORS | CONVERSION DESTINATION OPERATORS |
|---|---|
| == | is |
| != | is not |

R3

CONVERSION DEVICE AND CONVERSION PROGRAM

CROSS-REFERENCE TO RELATED APPLICATIONS

The present application is based on PCT filing PCT/JP2019/019975, filed May 20, 2019, which claims priority to JP 2018-190422, filed Oct. 5, 2018, the entire contents of each are incorporated herein by reference.

TECHNICAL FIELD

The present invention relates to a conversion device and recording medium.

BACKGROUND ART

Pattern matching is a technology of searching data and logs for a particular pattern. The pattern matching technology is used in a wide range of application areas of security.

For example, an intrusion detection system (IDS) stores therein patterns of unauthorized traffic as a signature and monitors a target network for data containing the patterns to detect unauthorized traffic, or in other words, to detect attacks or intrusions of attackers. Anti-viruses store, as a signature, patterns of characteristic byte sequences and character strings found in malware and check a target file for the patterns described in the signature to detect malware. Searching a large amount of data or logs that record processed data for particular patterns is a basic technology in the field of security applications.

The detection accuracy of a system using pattern matching, that is, the detection accuracy of the IDS or an anti-virus depends on the accuracy and the amount of a signature describing characteristic byte sequences and character strings found in unauthorized traffic patterns or malware. In other words, if a system stores therein a signature that covers all types of attacks and malware, the system can detect all the attacks, intrusions, and malware that occur many times.

There are many signatures available in various formats and these signatures are used in accordance with the purposes of application and use cases. Here, the signatures are classified into the following two categories: signatures that can be executed as a computer program (programmable signatures); and signatures that cannot be executed as a computer program (static signatures).

Programmable signatures are signatures written in C language, Python, or a programming language dedicated to software or devices using such signatures. In other words, the programmable signatures are signatures written in an imperative language. The programmable signatures can receive data and logs as an input and describe, as a computer program, conditions on the data and the logs for detecting particular attacks or malware. The programmable signatures, which are described as a computer program, can use a wide variety of functions provided by the programming languages and the libraries to describe detection conditions. In this regard, using the programmable signatures can increase cost effectiveness in the development and maintenance of the system.

However, software and devices using a programmable signature need to include an execution environment for executing the computer program. Thus, use of the programmable signatures tends to be restricted to specific types of software and devices, and the programmable signatures are in turn operative only on such software and devices.

Static signatures, on the other hand, describe patterns and characteristics that users wish to find in data and logs. Examples of static signatures include open indicators of compromise (OpenIOC), cyber observable expression (CybOX), and Snort. Static signatures may be written in a declarative language. Static signatures can receive data and logs as an input, and can describe characteristics, features, and patterns for detecting particular attacks or malware. Static signatures can succinctly describe targets to be detected by describing the detection features as patterns and characteristics.

The software or device using a static signature needs to include a matching engine. However, due to the simplicity of the logic for detection, including the matching engine costs much less than including an execution environment for a programming language in the software or device using a programmable signature. Moreover, static signatures can be implemented specifically for pattern matching, and thus can operate at high speed. In this regard, static signatures are supported by various types of software and devices compared to the programmable signatures.

Unlike programmable signatures, static signatures are only allowed to use a detection logic within a predetermined range. Thus, it is difficult for the static signatures to describe specific detection rules.

Since such signatures include information describing characteristics of attacks and malware, they are dealt with as valuable data. Thus, the signatures are, for example, exchanged among users in a community as threat information or are sold as a signature product.

There are some static signatures written in different formats. In this case, users convert the formats to make target signatures operable on the users' software or devices. For this purpose, some conversion tools are published by vendors or volunteers. The users can convert a format of a static signature into a format supported by the users' software or devices by using such a conversion tool, and thus can use other static signatures.

CITATION LIST

Patent Citation

Non Patent Document 1: James C. King, "Symbolic Execution and Program Testing", Communications of the ACM CACM Homepage archive Volume 19 Issue 7, July 1976 Pages 385-394

SUMMARY OF INVENTION

Technical Problem

The accuracy of signatures matters in a system using pattern matching. At the same time, it is desirable that the signatures are widely shared in a community and widely available to many users. If the format of a signature is not compatible with the format of software or a device of a user, the user can use a format conversion tool to convert the format of the signature into the format supported by the user's software or device, and the user can use the signature. In this regard, the technique of converting signature formats is important.

As described above, many conversion tools for converting formats between different static signatures have been developed and published by vendors and volunteers. However, very few conversion tools have been published that convert a programmable signature into a static signature.

If a user wants to convert a programmable signature into a static signature, the user needs to ask an expert having domain knowledge to analyze the programmable signature and identify the logic for alerting a detection, and the expert performs the conversion operation manually. This method requests an expert having domain knowledge, and due to the manual conversion operation, this method cannot process a large amount of information. This method may possibly include detection errors if the detection logic is too complicated.

Conversely, converting a static signature into a form applicable to a programmable signature is relatively easy. Since static signatures have primitive structure as mentioned above, many parsers and matching engines for analyzing the signatures are available and are often provided as libraries. The programmable signature can take the static signature by only importing and calling such libraries. Thus, converting a static signature into a programmable signature is not a major problem to be solved.

Due to the reasons above, programmable signatures suffer from some drawbacks in practical application in that the programmable signatures tend to be only available to specific software or devices and the knowledge relating to the programmable signatures is not widely shared or exploited in a community.

The present invention has been made in view of the foregoing, and it is an object of the present invention to provide a conversion device and a conversion program that can automatically convert a programmable signature into a static signature.

Solution to Problem

A conversion device according to the present invention includes: processing circuitry configured to: receive a programmable signature as a target to be analyzed and symbolized data and/or a log as an input value, analyze the programmable signature by using a symbolic execution engine, and output a conditional branching process executed on the input value as a constraint on the input value; and receive the output constraint on the input value, perform field conversion from the constraint on the input value to an output format based on a table of field name correspondence between formats, and output a static signature.

Advantageous Effects of Invention

According to the present invention, a programmable signature can be automatically converted into a static signature.

BRIEF DESCRIPTION OF DRAWINGS

FIG. 3 is a diagram illustrating an example programmable signature.

FIG. 4 is a diagram illustrating an example field conversion table.

EMBODIMENTS FOR CARRYING OUT THE INVENTION

Figure 1:
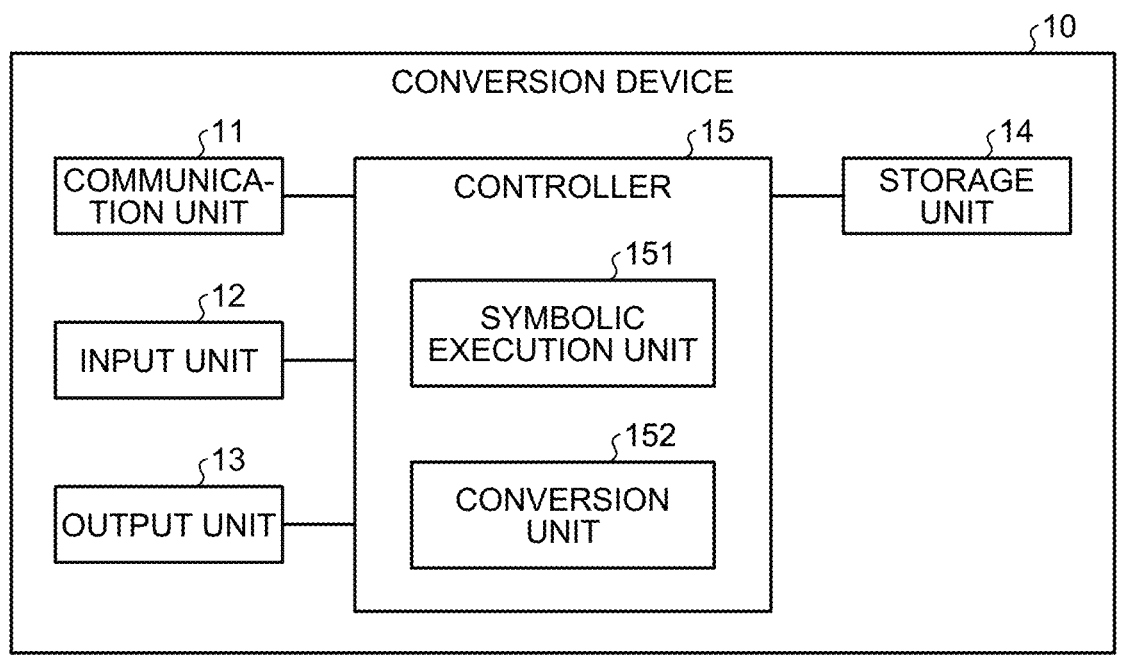
FIG. 1 is a schematic diagram illustrating an example configuration of a conversion device according to an embodiment.

The following describes an embodiment of the present invention with reference to the accompanying drawings. The embodiment is not intended to limit the scope of the present invention. Same reference signs are used to refer to the same or like components in the drawings.

Embodiment

The embodiment of the present invention will be described. A conversion device according to the embodiment of the present invention performs symbolic execution (see, for example, Non Patent Document 1) to analyze a programmable signature and extract a condition under which the signature alerts a detection.

First, the conversion device symbolizes data and/or a log (hereinafter referred to as data/log) to be examined by the programmable signature. The conversion device then inputs the symbolized data/log to the programmable signature and executes the programmable signature on a symbolic execution engine and analyzes the signature. When the conversion device encounters a conditional branch (e.g., IF statement) to be executed by the programmable signature on the input value during the analysis, the conversion device calculates constraints on the input value for both cases in which the condition of the conditional branch is satisfied and in which the condition of the conditional branch is not satisfied. The conversion device then adds the calculated constraints as execution conditions of the respective paths.

The conversion device continues this procedure until the programmable signature finally alerts a "detection" or "no detection". In this procedure, the conversion device can acquire constraints on the input value accumulated until the programmable signature alerts a "detection" and constraints on the input value accumulated until the programmable signature alerts "no detection", in the form of logical expressions. A set of constraints on the input value accumulated until the programmable signature alerts a "detection" are represented in a primitive form compared to the logic for alerting a "detection" described in the original programmable signature. In this regard, the set of constraints on the input value can be easily converted into other formats or expressions.

Configuration of Conversion Device

A specific configuration of the conversion device according to the present embodiment is described. FIG. 1 is a schematic diagram illustrating an example configuration of the conversion device according to the embodiment.

As illustrated in FIG. 1, this conversion device 10 includes a communication unit 11, an input unit 12, an output unit 13, a storage unit 14, and a controller 15. The conversion device 10 is supposed to be used by creators who create signatures for use in, for example, an IDS or an anti-virus, or by administrators or users of the software and devices using such signatures.

The communication unit 11 is a communication interface configured to transmit and receive various types of information to and from other devices connected via, for example, a network. The communication unit 11 is implemented by, for example, a network interface card (NIC) and enables the controller 15 to communicate with other devices via a telecommunication line such as a local area network (LAN) or the Internet. For example, the communication unit 11 receives symbolized data/log and a programmable signature via, for example, a network N and inputs the received data/log and signature to the controller 15. The communication unit 11 transmits a static signature into which the programmable signature has been converted to other devices via, for example, the network N. The symbolized data/log is obtained by symbolizing the data/log to be examined by the programmable signature.

The input unit 12 is an input interface with which various types of operations are input from an operator of the conversion device 10. For example, the input unit 12 is configured by input devices such as a touch panel, a voice input device, a keyboard, and a mouse.

The output unit 13 is implemented by, for example, a display device such as a liquid crystal display, a printing device such as a printer, and an information communication device. The output unit 13 outputs, to the operator, information relating to, for example, conversion processing on the programmable signature.

The storage unit 14 is implemented by, for example a semiconductor memory such as a random-access memory (RAM) and a flash memory, or a storage device such as a hard disk and an optical disc. The storage unit 14 stores therein a processing program for operating the conversion device 10 and data used during execution of the processing program. The storage unit 14 stores therein a table of field name correspondence between formats.

The controller 15 includes an internal memory for storing a computer program that defines various procedures and requested data and executes various types of processing using the stored program and data. For example, the controller 15 is an electronic circuit such as a central processing unit (CPU) or a micro processing unit (MPU). The controller 15 includes a symbolic execution unit 151 (execution unit) and a conversion unit 152.

The symbolic execution unit 151 receives a programmable signature as a target to be analyzed and symbolized data/log as an input value, and then analyzes the programmable signature by using a symbolic execution engine and outputs conditional branching processes executed on the input value as constraints on the input value.

The conversion unit 152 receives the output constraints on the input value, and then performs field conversion from the constraints on the input value to an output format based on the table of field name correspondence between formats, and outputs a static signature. In other words, the conversion device 10 converts the input programmable signature into a static signature and outputs the static signature.

Procedure of Conversion Processing

Figure 2:
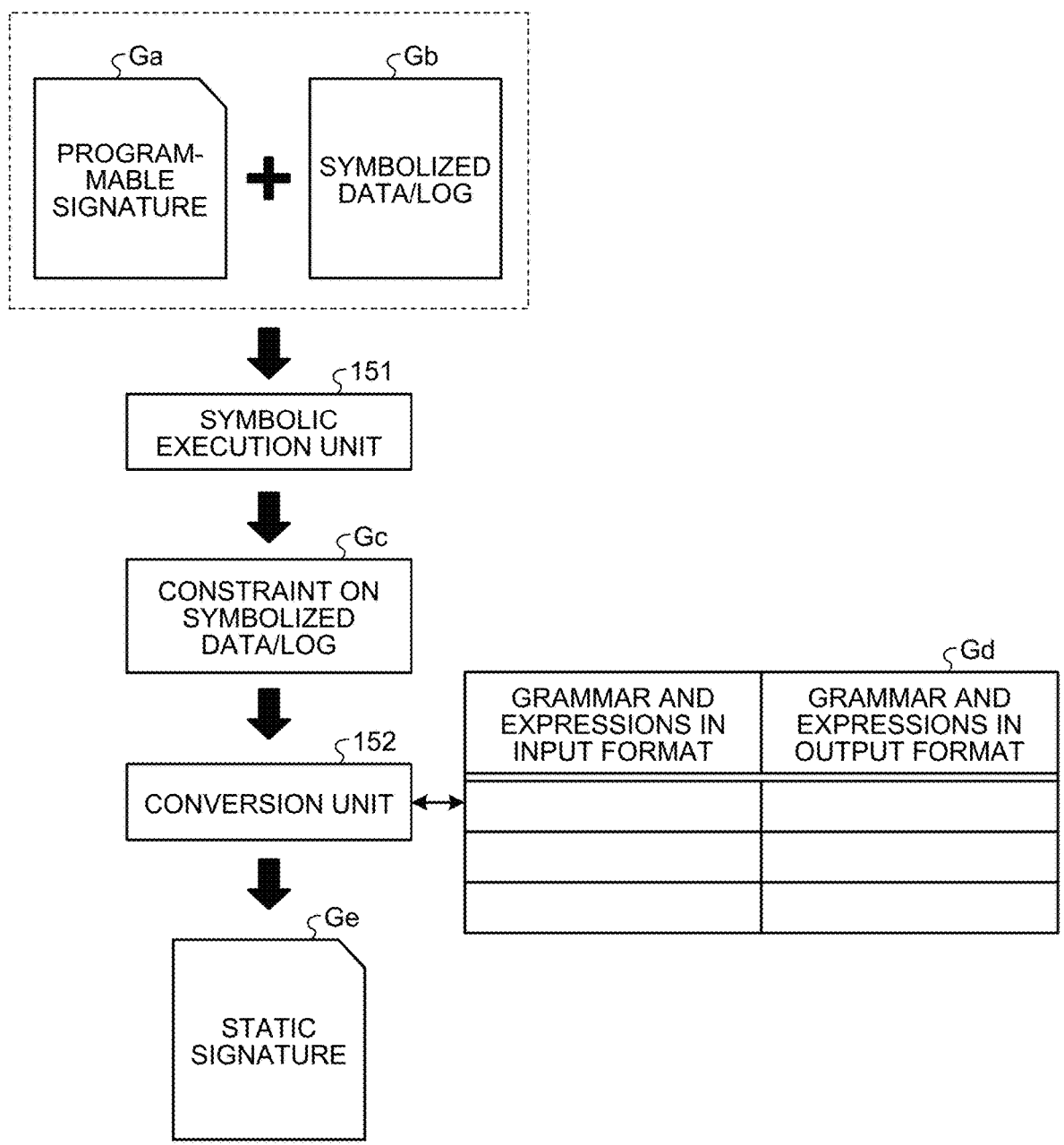
FIG. 2 is a diagram illustrating the procedure performed by a symbolic execution unit and a conversion unit.

Described next is the procedure of conversion processing performed by the symbolic execution unit 151 and the conversion unit 152. FIG. 2 is a diagram illustrating the procedure performed by the symbolic execution unit 151 and the conversion unit 152.

The symbolic execution unit 151 performs symbolic execution to analyze a programmable signature that is a target to be analyzed. As illustrated in FIG. 2, the symbolic execution unit 151 receives, as an input, a programmable signature Ga and symbolized data/log Gb that is to be input to the programmable signature.

First, why the symbolized data/log Gb is used is described. The programmable signature is a signature for examining data and logs to search for a match with characteristic conditions of attacks or malware. The data is, for example, data on the traffic or data stream of a file, and the logs include processed information on such data. What is extracted from the programmable signature in this analysis is conditions that the input value should satisfy to alert a detection. In this regard, the conversion device 10 inputs a symbol, which can take any value, to the programmable signature without fixing the input value to specific values.

The symbolic execution unit 151 performs symbolic execution to analyze the programmable signature Ga by using the symbolized data/log Gb. In this symbolic execution analysis, the symbolic execution unit 151 extracts conditional branch processes executed on the symbolized data as constraints on the input value until the programmable signature Ga alerts a "detection".

The symbolic execution unit 151 outputs constraints Gc on the symbolized data/log and then inputs the constraints Gc to the conversion unit 152. The conversion unit 152 performs field conversion from the input constraints to the output format based on a table of field name correspondence between formats Gd. The table of field name correspondence between formats Gd is a table associating, for example, the grammar and expressions of an input format with the grammar and expressions of an output format. If the descriptive grammar of the input constraints differs from that of the output format, the conversion unit 152 performs the conversion to absorb such difference. Lastly, the conversion unit 152 outputs a static signature Ge in a conversion target format and the process is ended.

Example Processing of Symbolic Execution Unit

Described next is the processing performed by the symbolic execution unit 151 with reference to a specific example. Definitions provided in this example are for explanation purposes only, and thus the processing and the operation of the conversion device 10 are not limited to these definitions. The present embodiment is independent of, for example, the implementation of the symbolic execution engine, the type of programming language, the format of the symbolized data/log, and the format of the static signature.

FIG. 3 is a diagram illustrating an example programmable signature. In this example, the symbolic execution unit 151 analyzes a computer program to obtain the behavior of the program and checks for a match between the behavior of the program and a signature defining previously acquired malicious behavior.

In FIG. 3, "accessed_regkey_logs" and "accessed_file_logs" are linked lists storing therein symbolized data/log. The symbolic variable names are "sym_regkey" and "sym_file", respectively. If the sequences of the linked lists include both registry key "xyz" and file name "abc", the programmable signature alerts a "detection" and returns "true". If only one of the registry key "xyz" and the file name "abc" is detected or none of them is detected, the programmable signature alerts "no detection" and returns "false".

The symbolic execution unit 151 executes this programmable signature. As the execution proceeds, the symbolic execution unit 151 encounters a conditional branch at line 2, at which the symbolic execution unit 151 adds constraints, to the respective paths, of the cases in which the condition at line 2 is satisfied and in which the condition at line 2 is not satisfied. In other words, if true at this conditional branch, the symbolic execution unit 151 adds a constraint "sym_regkey=="xyz"" to the path that executes line 2 and line 3, and if false at this conditional branch, the symbolic execution unit 151 adds a constraint "Not (sym_regkey=="xyz")" to the path that executes line 2 and line 4.

As the symbolic execution continues along the respective paths, the symbolic execution unit 151 encounters another conditional branch at line 6. In the same manner, the symbolic execution unit 151 adds constraints, to the paths, of the cases in which the condition at line 6 is satisfied and in which the condition at line 6 is not satisfied. In other words, the symbolic execution unit 151 adds a constraint "sym_file=="abc"" to the path that executes line 6 and line 7 and adds a constraint "Not(sym_file=="abc")" to the path that executes line 6 and line 8.

In summary, when the symbolic execution unit 151 symbolically executes the programmable signature illustrated in FIG. 3, the symbolic execution unit 151 obtains the following four paths, a first path to a fourth path. For ease of explanation, let the sequence of "accessed_regkey_logs" contain a single element "sym_regkey" and let the sequence of "accessed_file_logs" contain a single element "sym_file".

First path: 1→2→3→4→5→6→7→8→9→10
Second path: 1→2→3→4→5→6→8→9→11→12
Third path: 1→2→4→5→6→7→8→9→11→12
Fourth path: 1→2→4→5→6→8→9→11→12

Among the four paths, only the first path alerts a "detection" and returns "true". The symbolic execution unit 151 thus inputs, to the conversion unit 152, the constraint "sym_regkey=="xyz"∧sym_file=="abc"" obtained in the execution of the first path. When the symbolic execution unit 151 detects a plurality of paths that alert a "detection" in the symbolic execution, the symbolic execution unit 151 connects the constraints with "v" and outputs the connected constraints.

Example Processing of Conversion Unit

Described next is the processing performed by the conversion unit 152 with reference to a specific example. The conversion unit 152 performs field conversion based on a symbolic variable name in the constraints and a table of field name correspondence corresponding to a field name in a conversion destination format. The conversion unit 152 also performs conversion of operators for use in evaluating fields and values in accordance with the conversion destination format.

Figures 5, 6:
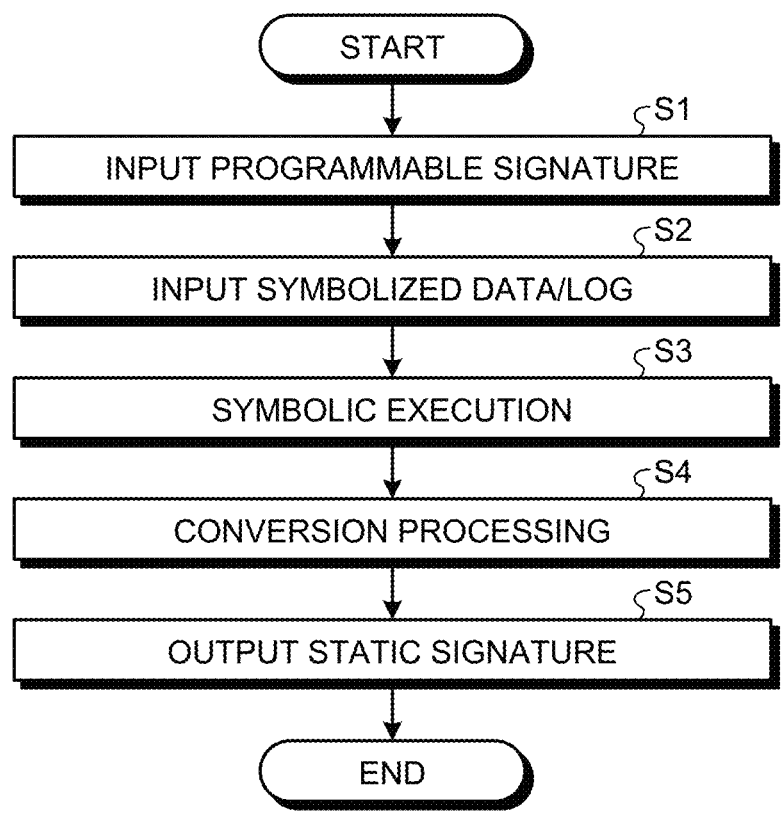
FIG. 5 is a diagram illustrating an example operator conversion table.
FIG. 6 is a flowchart illustrating the procedure of a conversion method according to the embodiment.

FIG. 4 is a diagram illustrating an example field conversion table. FIG. 5 is a diagram illustrating an example operator conversion table. The field conversion table illustrated in FIG. 4 is a table associating symbolic variable names with conversion destination fields. The operator conversion table illustrated in FIG. 5 is a table associating conversion source operators with conversion destination operators. The conversion unit 152 performs field conversion by using a table of field name correspondence that corresponds to a field name in the conversion destination format and includes the field conversion table and the operator conversion table.

The conversion unit 152 performs the conversion by using, for example, the field conversion table illustrated in FIG. 4 and the operator conversion table illustrated in FIG. 5. Specifically, the conversion unit 152 converts "sym_regkey=="xyz"∧sym_file=="abc"" into "RegkeyItem is "xyz" and FileItem is "abc"" based on rows R1 and R2 in the field conversion table and row R3 in the operator conversion table. The conversion unit 152 outputs "RegkeyItem is "xyz" and FileItem is "abc"" and writes this output in, for example, a file.

As described above, the conversion unit 152 performs the field conversion based on a symbolic variable name in the constraints on the input value and a table of field name correspondence corresponding to a field name in the output format in a plurality of the tables of field name correspondence between formats.

Conversion Processing

Described next is the procedure of conversion processing performed by the conversion device 10. FIG. 6 is a flowchart illustrating the procedure of a conversion method according to the embodiment.

As illustrated in FIG. 6, the symbolic execution unit 151 receives an input of a programmable signature as a target to be analyzed and symbolized data/log as an input value (Steps S1, S2). The symbolic execution unit 151 then performs symbolic execution to analyze the programmable signature by using a symbolic execution engine and output conditional branch processes executed on the input value as constraints on the input value (Step S3).

Upon receiving the output constraints on the input value from the symbolic execution unit 151, the conversion unit 152 performs conversion processing of field conversion from the constraints on the input value to an output format based on the table of field name correspondence between formats (Step S4). The conversion unit 152 converts the programmable signature into a static signature and then outputs the static signature (Step S5), and the process is ended.

Effects of Embodiment

The conversion device 10 according to the embodiment above receives a programmable signature as a target to be analyzed and symbolized data/log as an input value, and then analyzes the programmable signature by using a symbolic execution engine and outputs conditional branching processes executed on the input value as constraints on the input value. Upon receiving the output constraints on the input value, the conversion device 10 performs field conversion from the constraints on the input value to an output format based on a table of field name correspondence between formats, and outputs a static signature.

According to the embodiment, a programmable signature can be automatically converted into a static signature. In other words, according to the embodiment, programmable signatures, which tend to be only available to specific software and devices, can be used by software and devices only supporting a static signature. According to the embodiment, knowledge and know-how relating to attacks and malware described in programmable signatures can be widely available.

In addition, users of software or devices only supporting a static signature can develop a signature written in a programming language by using the conversion device 10 according to the embodiment. As described above, programmable signatures can be described in programming languages having a wide variety of functions and libraries. Using the conversion device 10 according to the embodiment allows the users to describe detailed detection conditions and develop a detection system at low cost.

In addition to the use case of detecting malicious behavior described above, the embodiment is applicable to extracting detection conditions by symbolizing, for example, network traffic and its logs and analyzing a signature for detecting attacks and intrusions of attackers by symbolic execution.

The embodiment is also applicable to extracting detection conditions by symbolizing, for example, byte streams, header information, and character string information of a file and analyzing a signature for detecting malware by symbolic execution.

System Configurations

The illustrated components of the device are functionally conceptual and need not be physically configured as illustrated. In other words, the specific modes of distribution and integration of the device are not limited to those illustrated, and all or a part thereof can be functionally or physically distributed or integrated in any desired units according to various kinds of load and conditions of use. Furthermore, all or any desired part of processing functions performed in the device may be implemented by a CPU or a computer program analyzed and executed by the CPU or may be implemented as hardware by wired logic.

Among the processes described in the embodiment above, all or some of the processes described as being automatically performed may be manually performed, or all or some of the processes described as being manually performed may be automatically performed by a known technique. Furthermore, the process procedure, the control procedure, specific names, information including various types of data and parameters described in the description above or illustrated in the drawings may be optionally changed unless otherwise specified.

Computer Program

Figure 7:
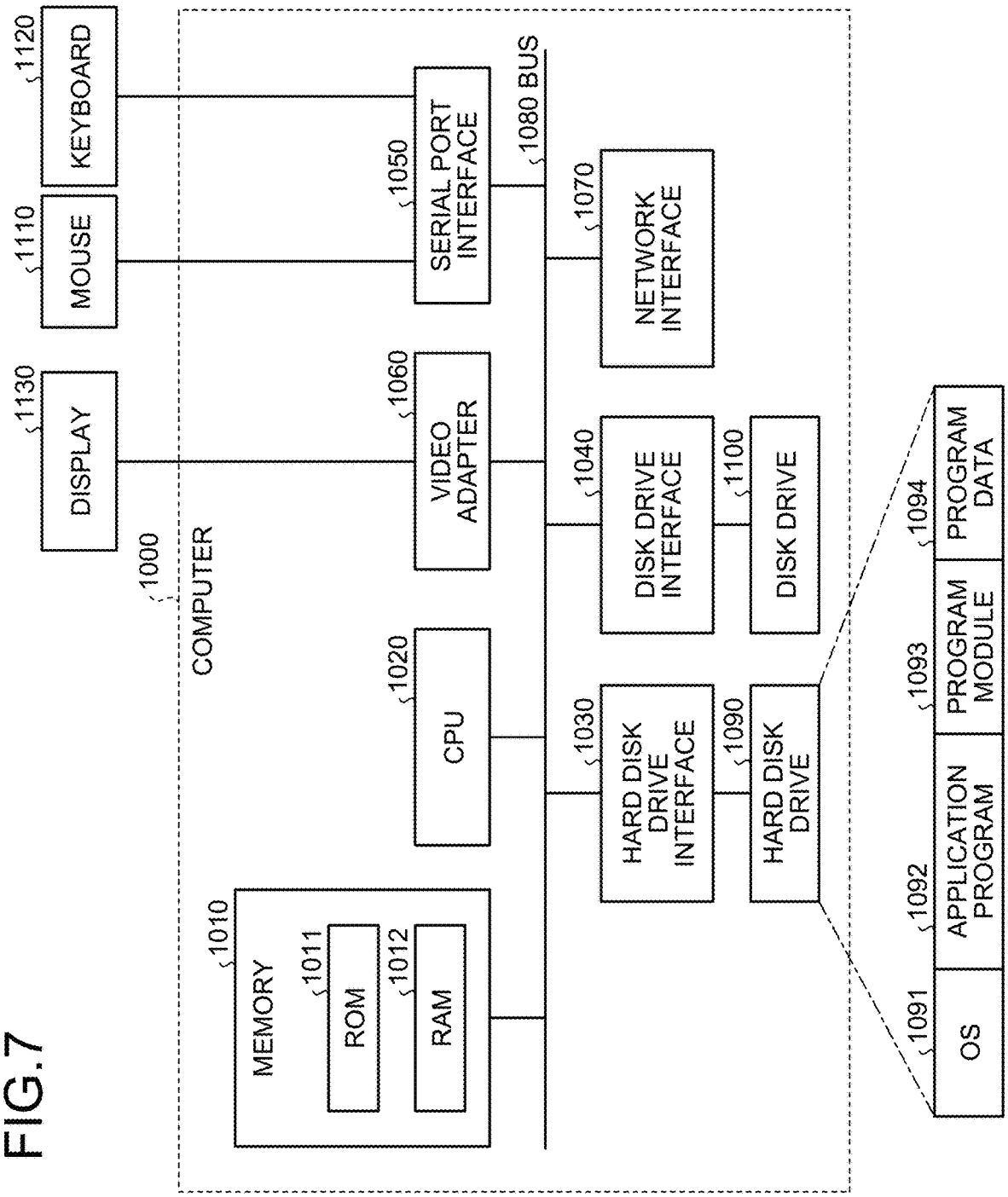
FIG. 7 is a diagram illustrating an example computer that implements the conversion device by executing a computer program.

FIG. 7 is a diagram illustrating an example computer that implements the conversion device 10 by executing a computer program. This computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These components are connected via a bus 1080.

The memory 1010 includes a read only memory (ROM) 1011 and a RAM 1012. The ROM 1011 stores therein, for example, a boot program such as basic input/output system (BIOS). The hard disk drive interface 1030 is coupled to a hard disk drive 1090. The disk drive interface 1040 is coupled to a disk drive 1100. For example, a detachable storage medium such as a magnetic disk or an optical disc is inserted in the disk drive 1100. The serial port interface 1050 is coupled to, for example, a mouse 1110 and a keyboard 1120. The video adapter 1060 is coupled to, for example, a display 1130.

The hard disk drive 1090 stores therein, for example, an operating system (OS) 1091, an application program 1092, a program module 1093, and program data 1094. In other words, the computer program that defines the processes of the conversion device 10 is implemented as the program module 1093 including codes that can be executed by the computer 1000. The program module 1093 is stored in, for example, the hard disk drive 1090. For example, the program module 1093 for executing the same processes as those of the functional configurations of the conversion device 10 is stored in the hard disk drive 1090. The hard disk drive 1090 may be substituted by a solid-state drive (SSD).

The setup data for use in the processes of the embodiment above is stored in, for example, the memory 1010 or the hard disk drive 1090 as the program data 1094. The CPU 1020 loads, as necessary, the program module 1093 and the program data 1094 stored in the memory 1010 or the hard disk drive 1090 on the RAM 1012 for execution.

The program module 1093 and the program data 1094 may not necessarily be stored in the hard disk drive 1090, and may be stored in, for example, a detachable storage medium and may be read by the CPU 1020 via, for example, the disk drive 1100. Alternatively, the program module 1093 and the program data 1094 may be stored in another computer connected via a network such as a LAN or a wide area network (WAN). The program module 1093 and the program data 1094 may be read by the CPU 1020 from the other computer via the network interface 1070.

Although one embodiment of the present invention made by the inventors has been described, the scope of the present invention is not limited by the description or drawings that configure part of the disclosure of the present invention. In other words, other embodiments, examples, and application techniques made by those skilled in the art based on the embodiment above are encompassed within the scope of the present invention.

DESCRIPTION OF SIGNS

10 Conversion device
11 Communication unit
12 Input unit
13 Output unit
14 Storage unit
15 Controller
151 Symbolic execution unit
152 Conversion unit

The invention claimed is:

1. A conversion device comprising:
processing circuitry configured to:
   receive a programmable signature as a target to be analyzed and symbolized data and/or a log as an input value, analyze the programmable signature by using a symbolic execution engine, and output a conditional branching process executed on the input value as a constraint on the input value; and
   receive the output constraint on the input value, perform field conversion from the constraint on the input value to an output format based on a table of field name correspondence between formats, and output a static signature.

2. The conversion device according to claim 1, wherein the processing circuitry is further configured to output the conditional branching process performed on the symbolized data as the constraint on the input value until the programmable signature alerts a detection.

3. The conversion device according to claim 1, wherein the processing circuitry is further configured to perform the field conversion based on a symbolic variable name in the constraint on the input value and a table of field name correspondence corresponding to a field name in the output format in a plurality of tables of field name correspondence between formats.

4. A non-transitory computer-readable recording medium storing therein a conversion program that causes a computer to execute a process comprising:
receiving a programmable signature as a target to be analyzed and symbolized data and/or a log as an input value, analyzing the programmable signature by using a symbolic execution engine, and outputting a conditional branching process executed on the input value as a constraint on the input value; and receiving the output constraint on the input value, performing field conversion from the constraint on the input value to an output format based on a table of field name correspondence between formats, and outputting a static signature.

\* \* \* \* \*